United States Patent
Caruso et al.

(10) Patent No.: US 9,108,364 B2
(45) Date of Patent: Aug. 18, 2015

(54) SOLVENT-PROMOTED SELF-HEALING MATERIALS

(75) Inventors: Mary M. Caruso, Urbana, IL (US); David A. Delafuente, Augusta, GA (US); Benjamin J. Blaiszik, Urbana, IL (US); Jason M. Kamphaus, Missouri City, TX (US); Nancy R. Sottos, Champaign, IL (US); Scott R. White, Champaign, IL (US); Jeffrey S. Moore, Savoy, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 1098 days.

(21) Appl. No.: 12/739,537

(22) PCT Filed: Oct. 27, 2008

(86) PCT No.: PCT/US2008/081291
§ 371 (c)(1),
(2), (4) Date: Nov. 5, 2010

(87) PCT Pub. No.: WO2009/055772
PCT Pub. Date: Apr. 30, 2009

(65) Prior Publication Data
US 2011/0039980 A1    Feb. 17, 2011

Related U.S. Application Data

(60) Provisional application No. 60/983,004, filed on Oct. 26, 2007.

(51) Int. Cl.
*B29C 73/22* (2006.01)
*B29C 73/16* (2006.01)

(52) U.S. Cl.
CPC ............. *B29C 73/163* (2013.01); *B29C 73/22* (2013.01)

(58) Field of Classification Search
CPC ....................................................... B29C 73/22
USPC .......................................................... 523/400
See application file for complete search history.

(56) References Cited

U.S. PATENT DOCUMENTS

| | | | |
|---|---|---|---|
| 3,830,750 A * | 8/1974 | Wellman | 430/137.11 |
| 4,409,201 A * | 10/1983 | Heinrich et al. | 424/419 |
| 4,610,927 A * | 9/1986 | Igarashi et al. | 428/402.21 |
| 4,737,484 A * | 4/1988 | Iwasaki et al. | 503/209 |
| 4,940,852 A * | 7/1990 | Chernack | 523/211 |
| 4,963,457 A * | 10/1990 | Matsushita et al. | 430/138 |
| 5,532,293 A | 7/1996 | Landis | |
| 6,518,330 B2 * | 2/2003 | White et al. | 523/200 |
| 6,766,817 B2 | 7/2004 | da Silva | |
| 6,858,659 B2 | 2/2005 | White et al. | |
| 7,022,179 B1 * | 4/2006 | Dry | 106/711 |
| 7,569,625 B2 | 8/2009 | Keller et al. | |
| 7,612,152 B2 | 11/2009 | Braun et al. | |
| 7,723,405 B2 | 5/2010 | Braun et al. | |
| 2002/0111434 A1 | 8/2002 | White et al. | |
| 2004/0007784 A1 | 1/2004 | Skipor et al. | |
| 2004/0146564 A1 * | 7/2004 | Subirade et al. | 424/499 |
| 2005/0020734 A1 * | 1/2005 | Asgarzadeh et al. | 523/400 |
| 2005/0147580 A1 * | 7/2005 | Connor et al. | 424/78.12 |
| 2005/0250878 A1 | 11/2005 | Moore et al. | |
| 2006/0042504 A1 * | 3/2006 | Kumar et al. | 106/14.34 |
| 2006/0111469 A1 | 5/2006 | White et al. | |
| 2006/0252852 A1 * | 11/2006 | Braun et al. | 523/200 |
| 2007/0166542 A1 * | 7/2007 | Braun et al. | 428/402.21 |
| 2008/0299391 A1 | 12/2008 | White et al. | |
| 2008/0305343 A1 | 12/2008 | Toohey et al. | |
| 2009/0202652 A1 * | 8/2009 | Stowell | 424/497 |
| 2010/0206088 A1 | 8/2010 | Potisek et al. | |

FOREIGN PATENT DOCUMENTS

| | | |
|---|---|---|
| JP | 59136348 | 8/1984 |
| JP | 63225659 | 9/1988 |

OTHER PUBLICATIONS

International Searching Authority, "International Search Report and Written Opinion for PCT/US2008/081291", Feb. 3, 2009, Publisher: European Patent Office.
Caruso, et al., "Self-Promoted Self-Healing Epoxy Materials", "Macromolecules", 2007, pp. 8830-8832, vol. 40.
Cho, et al., "Polydimethylsiloxane-Based Self-Healing Materials", "Adv. Mater.", 2006, pp. 997-1000, vol. 18.
Keller, et al., "A Self-Healing Poly(Dimethyl Siloxane) Elastomer", "Adv. Funct. Mater.", 2007, pp. 2399-2404, vol. 17.
Brown, et al., "In situ poly(urea-formaldehyde) microencapsulation of dicyclopentadiene", "J. Microencapsulation", 2003, pp. 719-730, vol. 20, No. 6.
Hsieh, et al., "Crack healing in poly(methyl methacrylate) induced by co-solvent of methanol and ethanol", "Polymer", May 26, 2001, pp. 1227-1241, vol. 42.
Lin, et al., "Methanol-Induced Crack Healing in Poly(Methyl Methacrylate)", "Polymer Engineering and Science", Nov. 1990, pp. 1399-1406, vol. 30, No. 21.
Shen, et al., "Thermally-induced crack healing in poly(methyl methacrylate)", "J. Mater. Res.", Jun. 2002, pp. 1335-1340, vol. 17, No. 6.

* cited by examiner

*Primary Examiner* — Megan McCulley
(74) *Attorney, Agent, or Firm* — Blanchard & Associates

(57) ABSTRACT

A composite material includes a solid polymer matrix, a plurality of capsules and a liquid, in the capsules. The liquid includes from 50 to 100 wt % of a solvent, and from 0 to 50 wt % of a polymerizer. There is no polymerizer outside of the capsules. The solid polymer matrix may include a native activating moiety for the polymerizer. The solvent may have a swelling ratio with the solid polymer matrix of at least 1.1 and/or may have a polarity ET of from 0.10 to 0.50.

15 Claims, 9 Drawing Sheets

SOLVENT-PROMOTED SELF-HEALING MATERIALS

REFERENCE TO RELATED APPLICATIONS

This application claims the benefit of U.S. Provisional Application No. 60/983,004, entitled "Solvent-Promoted Self-Healing Materials" filed Oct. 26, 2007, which is incorporated by reference in its entirety.

FEDERALLY SPONSORED RESEARCH OR DEVELOPMENT

The subject matter of this application may have been funded in part under a research grant from the Air Force Office of Scientific Research MURI under Grant Number FA9550-05-1-0346) and the National Science Foundation under Grant Number DMI 0328162. The U.S. Government may have rights in this invention.

BACKGROUND

Cracks that form within materials can be difficult to detect and almost impossible to repair. A successful method of autonomically repairing cracks that has the potential for significantly increasing the longevity of materials has been described, for example, in U.S. Pat. No. 6,518,330. This self-healing system includes a material containing, for example, solid particles of Grubbs catalyst and capsules containing liquid dicyclopentadiene (DCPD) embedded in an epoxy matrix. When a crack propagates through the material, it ruptures the microcapsules and releases DCPD into the crack plane. The DCPD then mixes with the Grubbs catalyst, undergoes Ring Opening Metathesis Polymerization (ROMP), and cures to provide structural continuity where the crack had been.

A challenge in designing autonomically self-healing composite materials such as these is to isolate the polymerizer (i.e. DCPD) from the corresponding activator (i.e. Grubbs activator) in the polymer matrix, while still providing for sufficient contact between the polymerizer and activator when a crack is formed in the matrix. In particular, it can be challenging to ensure that the activator is protected during the formation and use of the composite, and that it is sufficiently distributed within the polymer matrix so as to be available to form a polymer from the polymerizer. In conventional self-healing composite systems, the activator has been dispersed as solid particles of pure activator, or as particles containing the activator and an encapsulant such as wax. The use of capsules containing an activator has been described, for example, in Cho et al. *Adv. Mater.* 2006, 18, 997. In this system, a polymerizer was present as phase-separated droplets in the polymer matrix, rather than in capsules.

Composite materials that contain a polymerizer without an added activator have not shown autonomic self-healing behavior. In the DCPD systems described above, when control experiments were performed in the absence of catalyst, no healing was observed (White, S. R. et al. *Nature* 2001, 409, 794.). In another system, healing of polyester composites was investigated, based on polymerization of a monomer together with activating groups bound to the polyester matrix (D. Jung, et al., vol. MD-80, in Proceedings of the ASME International Mechanical Engineering Conference and Exposition, 265-275, 1997). The activating groups investigated in this system included carboxylic acid groups, ester groups, unsaturated groups, epoxide groups and amine groups. None of these native activating groups was able to provide self-healing of the matrix when contacted with the monomer from the capsules.

Another approach to healing cracks in a material does not use polymerizers or activators at all. Rather, this approach involves heating the material to bond the crack faces. The heating may be combined with the addition of a solvent to facilitate physical and/or chemical bonding between the polymer chains on either side of the crack face (Shen, J.-S. et al. *J. Mater. Res.* 2002, 17, 1335; Lin, C. B. et al. *Poly. Eng. & Sci.* 1990, 30, 1399; Hsieh, H.-C. *Polymer* 2001, 42, 1227). A crack in an epoxy polymer without any additives has been reported to heal at elevated temperatures, particularly when the polymer was formed with non-stoichiometric amounts of the epoxide and amine starting materials (Rahmathullah, A. M. et al. "Healing Behavior of DGEBA Epoxy Cured with a Cycloaliphatic Diamine." Proceedings of the First International Conference on Self-Healing Materials, Apr. 18-20, 2007, Noordwijk, The Netherlands, abstract). The drawback to this approach is that the material cannot self-heal autonomously, as the material must be heated by an outside source.

It is desirable to provide a self-healing material that includes fewer components than conventional self-healing materials, yet can autonomically self-heal when a crack occurs. It is also desirable to provide self-healing materials that do not include components that are expensive, unstable and/or difficult to process.

SUMMARY

In one aspect, the invention provides a composite material including a solid polymer matrix, a plurality of capsules and a liquid, in the capsules. The liquid includes from 50 to 100 wt % of a solvent, and from 0 to 50 wt % of a polymerizer. There is no polymerizer outside of the capsules.

In another aspect, the invention provides a composite material including a solid polymer matrix, a plurality of capsules and a liquid, in the capsules. The liquid includes a solvent and a polymerizer, and the solid polymer matrix includes a native activating moiety for the polymerizer.

In another aspect, the invention provides a composite material including a solid polymer matrix, a plurality of capsules and solvent, in the capsules. There is no polymerizer outside of the capsules. The solvent has a swelling ratio with the solid polymer matrix of at least 1.1.

In another aspect, the invention provides a composite material including a solid polymer matrix, a plurality of capsules and solvent, in the capsules. There is no polymerizer outside of the capsules. The solvent has a polarity $E_T$ of from 0.10 to 0.50.

In another aspect, the invention provides a method of making a composite material including combining ingredients including a plurality of capsules as described above and a matrix precursor, and solidifying the matrix precursor to form the solid polymer matrix.

In another aspect, the invention provides a method of increasing the lifetime of a polymer including combining a matrix precursor for the polymer with a plurality of capsules, and solidifying the matrix precursor to form a solid polymer matrix. The capsules include a solvent in the capsules. There is no polymerizer outside of the capsules, and a crack formed in the solid polymer matrix can self-heal.

The following definitions are included to provide a clear and consistent understanding of the specification and claims.

The term "polymer" means a substance containing more than 100 repeat units. The term "polymer" includes soluble and/or fusible molecules having long chains of repeat units, and also includes insoluble and infusible networks. The term "prepolymer" means a substance containing less than 100 repeat units and that can undergo further reaction to form a polymer.

The term "matrix" means a continuous phase in a material.

The term "polymerizer" means a composition that will form a polymer when it comes into contact with a corresponding activator for the polymerizer. Examples of polymerizers include monomers of polymers, such as styrene, ethylene, acrylates, methacrylates and dicyclopentadiene (DCPD); one or more monomers of a multi-monomer polymer system, such as diols, diamines and epoxides; prepolymers such as partially polymerized monomers still capable of further polymerization; and functionalized polymers capable of forming larger polymers or networks.

The term "activator" means anything that, when contacted or mixed with a polymerizer, will form a polymer. Examples of activators include catalysts and initiators. A corresponding activator for a polymerizer is an activator that, when contacted or mixed with that specific polymerizer, will form a polymer.

The term "native activating moiety" means a moiety of a polymer that, when mixed or contacted with a polymerizer, will form a polymer, and that is always consumed at the time it causes polymerization. Examples of a native activating moiety include an amine moiety, which can form a polymer with an epoxide.

The term "exogenous activator" means an activator that is not bound to a solid polymer matrix. Examples of exogenous activators include solid particles of a catalyst or an initiator, a catalyst or initiator that is encapsulated in an encapsulant such as wax, and a catalyst or initiator that is present in capsules.

The term "catalyst" means a compound or moiety that will cause a polymerizable composition to polymerize, and that is not always consumed each time it causes polymerization. This is in contrast to initiators, which are always consumed at the time they cause polymerization. Examples of catalysts include ring opening polymerization (ROMP) catalysts such as Grubbs catalyst. Examples of catalysts also include silanol condensation catalysts such as titanates and dialkyltincarboxylates. A corresponding catalyst for a polymerizer is a catalyst that, when contacted or mixed with that specific polymerizer, will form a polymer.

The term "initiator" means a compound or moiety that will cause a polymerizable composition to polymerize and, in contrast to a catalyst, is always consumed at the time it causes polymerization. Examples of initiators include peroxides, which can form a radical to cause polymerization of an unsaturated monomer; a monomer of a multi-monomer polymer system, such as a diol, a diamine, and an epoxide; and amines, which can form a polymer with an epoxide. A corresponding initiator for a polymerizer is an initiator that, when contacted or mixed with that specific polymerizer, will form a polymer.

The term "capsule" means a closed object having an aspect ratio of 1:1 to 1:10, and that may contain a solid, liquid, gas, or combinations thereof. The aspect ratio of an object is the ratio of the shortest axis to the longest axis, where these axes need not be perpendicular. A capsule may have any shape that falls within this aspect ratio, such as a sphere, a toroid, or an irregular ameboid shape. The surface of a capsule may have any texture, for example rough or smooth. Capsules may be hollow, or they may be solid particles.

The term "solvent" means a liquid that can dissolve another substance, and that is not a polymerizer.

The term "matrix precursor" means a composition that will form a matrix when it is solidified. A matrix precursor may include a monomer and/or prepolymer that can polymerize to form a solid polymer matrix. A matrix precursor may include a polymer that is dissolved or dispersed in a solvent, and that can form a solid polymer matrix when the solvent is removed. A matrix precursor may include a polymer at a temperature above its melt temperature, and that can form a solid polymer matrix when cooled to a temperature below its melt temperature.

The term "thermoset" means a polymer that is infusible and insoluble. A thermoset may be rigid or flexible. Typically, a thermoset is formed by irreversibly curing a polymerizer, such that the final polymer is a crosslinked network. Curing may be performed by any of a variety of processes, such as by contact with a curing reagent, by heating, or by irradiation with visible light, UV radiation, or an electron-beam.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
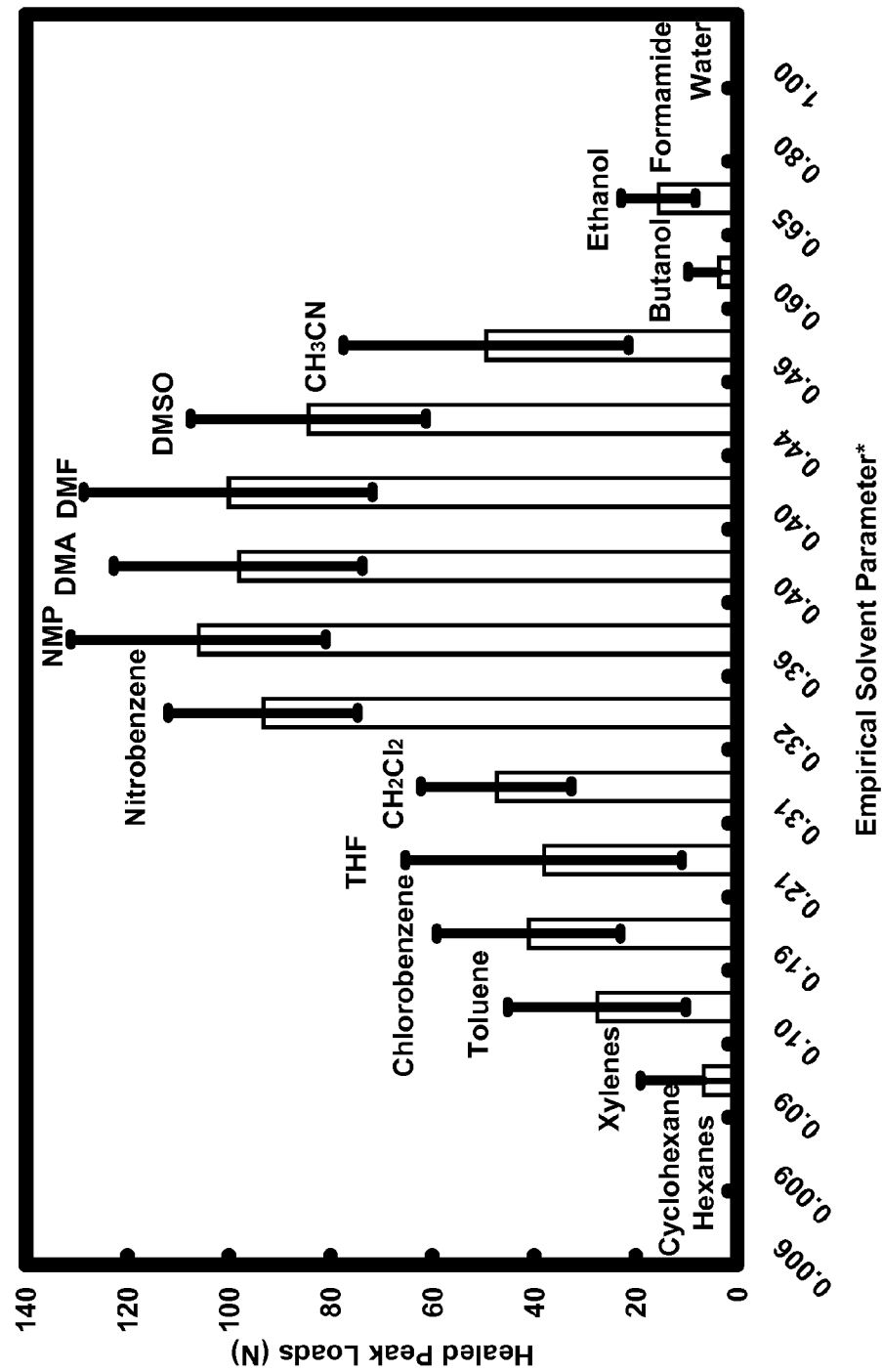
FIG. 1 is a graph of peak loads for healed epoxy thermoset samples that had been treated with solvent injections.

The present invention is based on the discovery that a solid polymer matrix can exhibit self-healing behavior in the absence of an added polymerizer component and/or an added activator component. A composite material that contains capsules, where the capsules include a solvent and optionally include a polymerizer, can autonomically self-heal when subjected to a crack. For capsules that include a polymerizer, the solid polymer matrix of the composite may include a native activating moiety. The composite material does not require a polymerizer outside of the capsules and/or an exogenous activator to self-heal.

A composite material may include a solid polymer matrix, a plurality of capsules, and a liquid in the capsules. The liquid includes from 50 to 100 weight percent (wt %) of a solvent, and from 0 to 50 wt % of a polymerizer. There is no polymerizer outside of the capsules. Preferably, the liquid includes from 75 to 100 wt % of the solvent. More preferably, the liquid includes from 85 to 100 wt % of the solvent. In one example, the liquid does not include a polymerizer.

The solid polymer matrix may include a polyamide such as nylon; a polyester such as poly(ethylene terephthalate) and polycaprolactone; a polycarbonate; a polyether; an epoxy polymer; an epoxy vinyl ester polymer; a polyimide such as polypyromellitimide (for example KAPTAN); a phenol-formaldehyde polymer such as BAKELITE; an amine-formaldehyde polymer such as a melamine polymer; a polysulfone; a poly(acrylonitrile-butadiene-styrene) (ABS); a polyurethane; a polyolefin such as polyethylene, polystyrene, polyacrylonitrile, a polyvinyl, polyvinyl chloride and poly (DCPD); a polyacrylate such as poly(ethyl acrylate); a poly (alkylacrylate) such as poly(methyl methacrylate); a polysilane such as poly(carborane-siloxane); and a polyphosphazene. Examples of polymer matrices also include elastomers, such as elastomeric polymers, copolymers, block copolymers, and polymer blends. Self-healing materials that include elastomers as the solid polymer matrix are disclosed, for example, in U.S. patent application Ser. No. 11/421,993 with inventors Keller et al., filed Jun. 2, 2006.

Preferably the solid polymer matrix includes a thermoset. More preferably the solid polymer matrix includes a rigid thermoset. A thermoset solid polymer matrix may be formed by curing a matrix precursor, such that the final polymer is a crosslinked network. Curing may be performed by any of a variety of processes, such as by contact with a curing reagent, by heating, or by irradiation, such as irradiation with visible light, UV radiation, or an electron-beam. Preferably the solid polymer matrix includes a thermoset selected from an epoxy thermoset, a phenolic thermoset, an amino thermoset, a polyester thermoset, an allyl thermoset, a polyurethane thermoset, a dicyanate thermoset, a bismaleimide thermoset, an acrylate thermoset, or a mixture of these. See, for example, Gotro, J. et al., "Thermosets" *Encyclopedia of Polymer Science and Technology*, John Wiley & Sons, 2004. Preferably the solid polymer matrix includes an epoxy thermoset.

The solid polymer matrix may include a native activating moiety for a polymerizer. For example, an epoxy thermoset matrix may include epoxide and/or amine groups, which may form a polymer when contacted with a polymerizer having amine groups or epoxide groups, respectively. In another example, a phenolic thermoset matrix may include phenol and/or aldehyde groups, which may form a polymer when contacted with a polymerizer having aldehyde or phenol groups, respectively. In another example, an amino thermoset matrix may include amine and/or aldehyde groups, which may form a polymer when contacted with a polymerizer having aldehyde or amine groups, respectively. In another example, a polyester thermoset matrix may include hydroxyl groups, which may form a polymer when contacted with a polymerizer having anhydride and/or carboxylic acid groups. In another example, a polyester thermoset matrix may include anhydride and/or carboxylic acid groups instead of, or in addition to, hydroxyl groups. Anhydride and/or carboxylic acid groups may form a polymer when contacted with a polymerizer having hydroxyl groups. In another example, a polyurethane thermoset matrix may include hydroxyl groups and/or isocyanate groups, which may form a polymer when contacted with a polymerizer having isocyanate or hydroxyl groups, respectively. In another example, an epoxy vinyl ester thermoset matrix, an allyl thermoset matrix or an acrylate thermoset matrix may include alkene groups, which may form a polymer when contacted with a polymerizer having alkene groups.

A native activating moiety in a solid polymer matrix may form a polymer having a chemical structure that is the same as, or different from, that of the solid polymer matrix. For example, amine groups may be present as native activating moieties in an epoxy thermoset matrix, and these groups may form a polymer with an epoxide polymerizer or with an aldehyde polymerizer. The polymer formed may be an epoxy polymer, an amino polymer, or a copolymer or mixture of these. In another example, hydroxyl groups may be present as native activating moieties in a polyester thermoset matrix, and these groups may form a polymer with a carboxylic acid polymerizer, with an anhydride polymerizer, or with an isocyanate polymerizer. The polymer formed may be a polyester, a polyurethane, or a copolymer or mixture of these.

Preferably the composite material does not include an exogenous activator. If the liquid in the capsules includes a polymerizer, the composite material preferably does not include an exogenous activator that is a corresponding activator for the polymerizer. Preferably the composite material does not include a solid particle of a catalyst or an initiator. Preferably the composite material does not include a catalyst or initiator that is encapsulated in an encapsulant such as wax. Preferably the composite material does not include a catalyst or initiator that is present in capsules.

The solid polymer matrix may include other ingredients in addition to the polymeric material. For example, the matrix may contain one or more stabilizers, antioxidants, flame retardants, plasticizers, colorants and dyes, fragrances, particulates, reinforcing fibers, or adhesion promoters.

The capsules isolate the liquid in the capsules until the composite is subjected to a crack, at which point the liquid from capsules intersecting the crack is released into the crack. The capsules have an aspect ratio of from 1:1 to 1:10, preferably from 1:1 to 1:5, more preferably from 1:1 to 1:3, more preferably from 1:1 to 1:2, and more preferably from 1:1 to 1:1.5.

In one example, the capsules may have an average diameter of from 10 nanometers (nm) to 1 millimeter (mm), more preferably from 30 to 500 micrometers, and more preferably from 50 to 300 micrometers. In another example, the capsules may have an average diameter less than 10 micrometers. Capsules having an average diameter less than 10 micrometers may be useful for applications such as self-healing thin films. Capsules having an average outer diameter less than 10 micrometers, and methods for making these capsules, are disclosed, for example, in U.S. patent application Ser. No. 11/756,280 with inventors White et al., filed May 31, 2007.

The capsules are hollow, having a capsule wall enclosing an interior volume containing the liquid. The thickness of the capsule wall may be, for example, from 50 nm to 10 micrometers. For capsules having an average diameter less than 10 micrometers, the thickness of the capsule wall may be from 30 nm to 150 nm, or from 50 nm to 90 nm. The selection of capsule wall thickness may depend on a variety of parameters, such as the nature of the solid polymer matrix in the coating, and the conditions for making and using the composite. For example, capsule walls that are too thick may not rupture when a crack approaches, while capsules walls that are too thin may break during processing.

Hollow capsules may be made by a variety of techniques, and from a variety of materials. Examples of materials from which the capsules may be made, and the techniques for making them include: polyurethane, formed by the reaction of isocyanates with a diol; urea-formaldehyde (UF), formed by in situ polymerization; gelatin, formed by complex coacervation; polyurea, formed by the reaction of isocyanates with a diamine or a triamine, depending on the degree of crosslinking and brittleness desired; polystyrene or polydivinylbenzene formed by addition polymerization; and polyamide, formed by the use of a suitable acid chloride and a water soluble triamine. For capsules having an average diameter less than 10 micrometers, the capsule formation may include polymerizing the capsule starting materials while the reaction mixture is in the form of a microemulsion.

The liquid in the capsules includes a solvent, and optionally may include a polymerizer. In addition, the liquid may include at least one other ingredient. Examples of other ingredients that may be in the liquid include stabilizers, other solvents, viscosity modifiers such as polymers, inorganic fillers, odorants, colorants and dyes, blowing agents, antioxidants, and co-catalysts. Preferably the liquid includes from 50 to 100 wt % of a solvent, and from 0 to 50 wt % of a polymerizer. Preferably, the liquid includes from 75 to 100 wt % of the solvent. More preferably, the liquid includes from 85 to 100 wt % of the solvent. In one example, the liquid does not include a polymerizer.

The solvent may be any liquid that can dissolve another substance, and that is not a polymerizer. The solvent may be an aprotic solvent, a protic solvent, or a mixture of these. Examples of aprotic solvents include hydrocarbons, such as cyclohexane; aromatic hydrocarbons, such as toluene and xylenes; halogenated hydrocarbons, such as dichloromethane; halogenated aromatic hydrocarbons, such as chlorobenzene and dichlorobenzene; substituted aromatic solvents, such as nitrobenzene; ethers, such as tetrahydrofuran (THF) and dioxane; ketones, such as acetone and methyl ethyl ketone; esters, such as ethyl acetate, phenylacetate and ethyl phenylacetate; amides, such as dimethyl acetamide (DMA) and dimethyl formamide (DMF); nitriles, such as acetonitrile; and sulfoxides, such as dimethyl sulfoxide (DMSO). Examples of protic solvents include water; alcohols, such as ethanol, isopropanol, butanol, cyclohexanol, and glycols; and amides, such as formamide. Preferably the solvent is an aprotic solvent. More preferably the solvent is a polar aprotic solvent. Preferred solvents include chlorobenzene, phenylacetate, THF, dichloromethane, nitrobenzene, NMP, DMA, DMF, DMSO and acetonitrile. Preferably the solvent includes chlorobenzene and/or phenylacetate.

The selection of the solvent may be affected by the chemical and/or physical properties of at least one other component of the composite. In one example, the selection of the solvent may be affected by the properties of the solid polymer matrix. Preferably the solvent will wet and/or penetrate the matrix, providing for plasticization and/or solvation of polymer chains in the matrix.

The solvent may be selected based on its ability to swell the solid polymer matrix. Preferably the solvent will swell the solid polymer matrix. The swelling ratio of a solvent with a solid polymer matrix is determined by the following test. A sample of 0.850±0.015 g of the solid polymer matrix is placed in a 10 mL vial, and then immersed in 2.0 mL of the solvent. The vial is sealed and maintained at room temperature for 24 hours. The sample is then removed from the solvent, wiped dry and weighed. If the sample has broken into two or more pieces, all the pieces are removed, wiped dry and weighed together. The swelling ratio is the ratio of the mass of the sample after the test, divided by the mass of the sample before the test, and is calculated as the average of two measurements. Preferably the solvent will swell the solid polymer matrix with a swelling ratio of at least 1.1. More preferably the solvent will swell the solid polymer matrix with a swelling ratio of at least 1.2, at least 1.3, at least 1.4, at least 1.5, at least 1.6, at least 1.7, at least 1.8, at least 1.9, at least 2.0, or at least 2.5.

The solvent also may be selected based on its polarity. The polarity of a solvent may be measured as the empirical solvent parameter $E_T$ of the solvent, as described in Reichardt, C. *Solvents and Solvent Effects in Organic Chemistry*, Wiley-VCH: New York, 1988; pp 407-410. Preferably the solvent has a polarity $E_T$ of from 0.10 to 0.50. More preferably the solvent has a polarity $E_T$ of from 0.15 to 0.50, and more preferably of from 0.30 to 0.45. In one example, solvents having a polarity $E_T$ of from 0.19 to 0.46 provided high levels of healing when manually applied to a crack in an epoxy matrix. Other polymer matrices may be healed by solvents having a different polarity window. For example, a crack in a solid polymer matrix having fewer heteroatoms in its chemical structure than an epoxy matrix may be healed by contact with solvents having lower polarities.

In another example, the selection of the solvent may be affected by the properties of the capsules. Preferably the capsule is insoluble in the solvent. Preferably the solvent remains in the capsule during formation and normal use of a composite in which the capsules are present. It may be desirable for the solvent to have a boiling point above the normal temperatures encountered during formation and use of the composite. Preferably the boiling point of the solvent is at least 100° C. More preferably the boiling point of the solvent is at least 130° C., at least 150° C., at least 190° C., or at least 200° C.

The optional polymerizer may include a polymerizable substance such as a monomer, a prepolymer, or a functionalized polymer having two or more reactive groups. The optional polymerizer may be a polymerizer for the solid polymer matrix, such that a polymer formed in the crack has a chemical structure that is similar to that of the solid polymer matrix. The optional polymerizer may be a polymerizer for a polymer that is different from the solid polymer matrix. For example, it may be desirable for a polymer formed in the crack to be more rigid or less rigid than the solid polymer matrix.

Preferably the polymerizer, when present in the composite material, is only present in the capsules. Thus, the composite material does not include any polymerizer outside of the capsules. Preferably the liquid in the capsules includes from 0 to 50 wt % of a polymerizer. More preferably, the liquid includes from 0 to 25 wt % of a polymerizer, and more preferably includes from 0 to 15 wt % of a polymerizer.

Examples of polymerizable substances include epoxide-functionalized monomers, prepolymers or polymers, which may form an epoxy polymer when contacted with amine groups. Examples of epoxide-functionalized polymerizers include diglycidyl ethers of bisphenol A (DGEBA), such as EPON® 828; diglycidyl ethers of bisphenol F (DGEBF), such as EPON® 862; tetraglycidyl diaminodiphenylmethane (TGDDM); and multi-glycidyl ethers of phenol formaldehyde novolac polymers, such as SU-8.

Examples of polymerizable substances also include amine-functionalized monomers, prepolymers or polymers, which may form an epoxy polymer when contacted with epoxide groups, or which may form an amino polymer when contacted with aldehyde groups. Examples of amine-functionalized polymerizers include aliphatic and aromatic diamines, triamines, and tetramines. Specific examples of amine-functionalized polymerizers include ethanediamine, triethylenetriamine, diethylenetriamine (DETA), hexamethylenetetramine, tetraethylenepentamine (TEPA), amine-terminated polymers or prepolymers such as $\alpha$-aminomethylethyl-$\omega$-aminomethylethoxy-poly[oxy(methyl-1,2-ethanediyl)], urea and melamine.

Examples of polymerizable substances also include phenol-functionalized monomers, prepolymers or polymers, which may form a phenol-formaldehyde polymer when contacted with aldehyde groups, or which may form a polymer when contacted with amine groups. Examples of phenol-functionalized polymerizers include novolac polymers and resole polymers.

Examples of polymerizable substances also include aldehyde-functionalized monomers, prepolymers or polymers, which may form a phenol-formaldehyde polymer when contacted with phenol groups, or which may form an amino polymer when contacted with amine groups. Examples of aldehyde-functionalized polymerizers include formaldehyde, and include aldehyde-terminated dendrimers such as ald-PAMAM.

Examples of polymerizable substances also include hydroxyl-functionalized monomers, prepolymers or polymers, which may form a polyester when contacted with carboxylic acid or anhydride groups, or which may form a polyurethane when contacted with isocyanate groups. Examples of hydroxyl-functionalized polymerizers include poly(ethylene glycol), poly(propylene glycol), glycerol, 1,4-butanediol, pentaerythritol, and saccharides.

Examples of polymerizable substances also include carboxylic acid-functionalized monomers, prepolymers or polymers, which may form a polyester when contacted with hydroxyl groups. Examples of carboxylic acid-functionalized polymerizers include oxalic acid, malonic acid, succinic acid, glutaric acid, adipic acid, maleic acid, and phthalic acid. Examples of polymerizable substances also include anhydride-functionalized monomers, prepolymers or polymers, which may form a polyester when contacted with hydroxyl groups. Examples of anhydride-functionalized polymerizers include oxalic anhydride, malonic anhydride, succinic anhydride, glutaric anhydride, adipic anhydride, maleic anhydride, and phthalic anhydride. Examples of polymerizable substances also include lactones (such as caprolactone) and lactams, which, when polymerized, will form polyesters and nylons, respectively.

Examples of polymerizable substances also include isocyanate-functionalized monomers, prepolymers or polymers, which may form a polyurethane when contacted with hydroxyl groups. Examples of isocyanate-functionalized polymerizers include hexamethylene diisocyanate (HDI), toluene diisocyanate (TDI), methylene diphenyl diisocyanate (MDI), isophorone diisocyanate (IPDI), phenylene diisocyanate, and 1,4-diisocyanatobutane.

Examples of polymerizable substances also include alkene-functionalized monomers, prepolymers or polymers, which may form a polymer when contacted with other alkene groups. Examples of alkene-functionalized polymerizers include diallyl phthalate (DAP), diallyl isophthalate (DAIP), triallyl isocyanurate, hexane dioldiacrylate (HDDA), trimethylol propanetriacrylate (TMPTA), and epoxy vinyl ester prepolymer and polymers. Examples of alkene-functionalized polymerizers also include monomers such as acrylates, alkylacrylates (including methacrylates and ethacrylates), styrenes, isoprene and butadiene.

Examples of polymerizable substances also include functionalized siloxanes, such as siloxane prepolymers and polysiloxanes having two or more reactive groups. Functionalized siloxanes include, for example, silanol-functional siloxanes, alkoxy-functional siloxanes, and allyl- or vinyl-functional siloxanes. Self-healing materials that include functionalized siloxanes as polymerizers are disclosed, for example, in U.S. Patent Application Publication 2006/0252852 A1 with inventors Braun et al., published Nov. 9, 2006; and in U.S. Patent Application Publication 2007/0166542 A1 with inventors Braun et al., published Jul. 19, 2007.

A composite material may include a solid polymer matrix, a plurality of capsules and a liquid in the capsules, where the liquid includes a solvent and a polymerizer, and the solid polymer matrix includes a native activating moiety for the polymerizer. The polymerizer may be a polymerizer as described above. The native activating moiety is a corresponding activator for the polymerizer, and may be a native activating moiety as described above. In one particular example, the polymerizer includes an epoxide polymerizer such as a diglycidyl ether of bisphenol A (DGEBA) and/or a diglycidyl ether of bisphenol F (DGEBF), and the solid polymer matrix includes amine groups. Preferably there is no polymerizer outside of the capsules.

A composite material may include a solid polymer matrix, a plurality of capsules, and a solvent in the capsules, where the solvent has a swelling ratio with the solid polymer matrix of at least 1.1. The solvent may have a swelling ratio with the solid polymer matrix of at least 1.2. In one particular example, the solid polymer matrix may be an epoxy thermoset formed from DGEBA and DETA. In this example, the solvent in the capsules may include at least one of chlorobenzene, phenylacetate, ethyl phenylacetate, THF, dichloromethane, nitrobenzene, NMP, DMA, DMF, and DMSO. The capsules may also include a polymerizer, such as DGEBA. There is no polymerizer outside of the capsules. For an epoxy thermoset formed from EPON® 828 and DETA, the solvents chlorobenzene, THF, dichloromethane, nitrobenzene, NMP, DMA, DMF and DMSO had swelling ratios with the epoxy matrix of 1.19, 1.13, 1.25, 1.17, 2.58, 1.99, 1.61 and 1.37, respectively.

A composite material may include a solid polymer matrix, a plurality of capsules, and a solvent in the capsules, where the solvent has a polarity $E_T$ of from 0.15 to 0.5. The solvent may have a polarity $E_T$ of from 0.30 to 0.45. In one particular example, the solid polymer matrix may be an epoxy thermoset formed from DGEBA and DETA. In this example, the solvent in the capsules may include at least one of chlorobenzene, phenylacetate, ethyl phenylacetate, THF, dichloromethane, nitrobenzene, NMP, DMA, DMF, DMSO, and acetonitrile. These solvents have polarity $E_T$ values of from 0.19 to 0.46. In this example, the capsules may also include a polymerizer, such as DGEBA. There is no polymerizer outside of the capsules.

A method of making a composite material includes combining ingredients including a matrix precursor and capsules, and solidifying the matrix precursor to form a solid polymer matrix. The capsules include a liquid including a solvent. The liquid optionally may include a polymerizer, and the solid polymer matrix optionally may include a native activating moiety for the polymerizer. Preferably there is no polymerizer outside of the capsules. The method may further include forming capsules containing the liquid. The matrix precursor may be any substance that can form a solid polymer matrix when solidified.

In one example, the matrix precursor includes a monomer and/or prepolymer that can polymerize to form a polymer. The capsules may be mixed with the monomer or prepolymer. The matrix precursor may then be solidified by polymerizing the monomer and/or prepolymer of the matrix precursor to form the solid polymer matrix.

In another example, the matrix precursor includes a polymer in a matrix solvent. The polymer may be dissolved or dispersed in the matrix solvent to form the matrix precursor, and the capsules then mixed into the matrix precursor. The matrix precursor may be solidified by removing at least a portion of the matrix solvent from the composition to form the solid polymer matrix.

In another example, the matrix precursor includes a polymer that is at a temperature above its melting temperature. The polymer may be melted to form the matrix precursor and then mixed with the capsules. The matrix precursor may be solidified by cooling the composition to a temperature below the melt temperature of the polymer to form the solid polymer matrix.

A composite material including a solid polymer matrix and capsules, where the capsules contain a liquid that includes a solvent, can be self-healing. When the composite is subjected to a crack, the liquid from the capsules can flow into the crack, allowing the crack faces to bond to each other or to a polymer formed in the crack. It is desirable for the capsules to be dispersed throughout the composite, so that a crack will intersect and break one or more capsules, releasing the liquid.

Preferably a composite material including a solid polymer matrix and capsules, where the capsules contain a liquid that includes a solvent, is self-healing by the following "self-healing test". Five samples of the material are provided in the shape of short-groove tapered double cantilever beam (TDCB) test samples, in which a 25 mm groove is molded. Each sample is subjected to fracture testing by the TDCB protocol. After inserting a precrack with a sharp razor blade into the groove of the sample, the sample is pin-loaded and tested to failure using an INSTRON load frame under displacement control at a rate of 5 micrometers per second (µm/s). The peak fracture load of each sample, $P_{c,virgin}$, is measured. After sample failure, the two crack faces are realigned, and the sample is allowed to heal for 24 h at room temperature (22° C.). After the 24 hours, the healed TDCB samples are again stressed to failure, and the peak fracture load of each sample, $P_{c,healed}$, is measured. The healing efficiency for each sample, η, is defined as the ratio of the peak loads at fracture for the virgin sample and for the corresponding healed sample, $\eta = P_{c,healed}/P_{c,virgin}$. The average healing efficiency of the material is calculated from the healing efficiencies of the 5 samples. A material is self-healing when its average healing efficiency is at least 50%.

Preferably the average healing efficiency of the composite material, when measured as described in the "self-healing test," is at least 60%. More preferably this average healing efficiency of the composite material is at least 70%. More preferably this average healing efficiency of the composite material is at least 80%, more preferably is at least 90%, more preferably is at least 95%, more preferably is at least 99%, and more preferably is at least 100%.

Capsules that include a liquid including a solvent may be used to increase the lifetime of a polymer. A method of increasing the lifetime of a polymer may include combining a matrix precursor for the polymer with a plurality of capsules, and solidifying the matrix precursor to form a solid polymer matrix. The capsules include a liquid including a solvent. The liquid optionally may include a polymerizer, and the solid polymer matrix optionally may include a native activating moiety for the polymerizer. Preferably there is no polymerizer outside of the capsules. A crack formed in the solid polymer matrix can self-heal.

The following examples are provided to illustrate one or more preferred embodiments of the invention. Numerous variations may be made to the following examples that lie within the scope of the invention.

EXAMPLES

Example 1

Solvent-Promoted Healing of an Epoxy Thermoset

Epoxy thermoset samples were prepared from epoxide polymerizer EPON® 828 (MILLER-STEPHENSON; Danbury, Conn.) and diethylenetriamine curing agent Ancamine® DETA (AIR PRODUCTS; Allentown, Pa.). The EPON® 828 epoxide polymerizer included a diglycidyl ether of bisphenol A (DGEBA). The two components were mixed at a ratio of 100:12 parts per hundred (pph) by weight, and poured into silicone rubber molds. The mixture was allowed to cure for 24 h at room temperature, followed by 24 h at 35° C. The cured thermoset samples were shaped for use as tapered double cantilever beam (TDCB) test samples.

The samples were subjected to fracture testing by the TDCB protocol, using long-groove TDCB specimens in which a 47 mm groove was molded. The TDCB geometry ensures controlled crack growth along the centerline of the composite material and provides a crack length independent measure of fracture toughness for both virgin and healed materials. After inserting a precrack with a sharp razor blade into the groove of the sample, the sample was pin-loaded and tested to failure using an INSTRON load frame under displacement control at a rate of 5 micrometers per second (µm/s). The peak fracture load, $P_{c,virgin}$, was measured.

Solvents were screened for their healing ability by manually injecting solvent on the crack plane of a fractured test specimen. After sample failure, 30 microliters of a solvent was injected onto the crack plane, the two crack faces were realigned, and the sample was allowed to heal for 24 h at room temperature (22° C.). The solvents used included cyclohexane, hexanes, xylenes, toluene, chlorobenzene, THF, methylene chloride, nitrobenzene, NMP, DMA, DMF, DMSO, acetonitrile, butanol, ethanol, and formamide. Each solvent was used as received from FISHER SCIENTIFIC (Fair Lawn, N.J.). After the 24 hours, the healed TDCB samples were again stressed to failure, the load-displacement curve was recorded, and the peak fracture load, $P_{c,healed}$, was measured.

FIG. 1 is a graph of peak loads for healed samples that had been treated with solvent injections. The "Empirical Solvent Parameter" values on the graph are the $E_T$ values of the solvents, as described in Reichardt, C. *Solvents and Solvent Effects in Organic Chemistry*, Wiley-VCH: New York, 1988; p 407-410. The five solvents that had the highest healing efficiencies were nitrobenzene, NMP, DMA, DMF, and DMSO. These solvents have dielectric constants ranging from 32-47 and boiling points that range from 153-210° C. Both low polarity solvents, such as cyclohexane and hexanes, and high polarity solvents, such as formamide and water, provided no measurable healing. This behavior is consistent with control experiments for conventional self-healing systems, in which no healing occurred in the absence of catalyst (White, S. R. et al. *Nature* 2001, 409, 794.). One possible explanation for the variation in healing efficiencies is that the five most efficient solvents (nitrobenzene, NMP, DMA, DMF, DMSO) are good hydrogen bond acceptors, providing strong interactions with free hydroxyl groups in the epoxy matrix.

Example 2

Solvent-Promoted Healing of Other Epoxy Thermosets

Epoxy thermoset samples were prepared as described in Example 1, but using different combinations of starting components. The components were poured into silicone rubber molds after mixing, and cured for 24 h at room temperature, followed by 24 h at 35° C. The cured thermoset samples were shaped for use as long-groove TDCB test samples.

For the first thermoset, the epoxide polymerizer was EPON® 862, and the curing agent was EPIKURE 3274 (MILLER-STEPHENSON). The EPON® 862 polymerizer included a diglycidyl ether of bisphenol F (DGEBF). The EPIKURE 3274 included α-aminomethylethyl-ω-aminomethylethoxy-poly[oxy(methyl-1,2-ethanediyl)] and nonyl phenol. The two components were mixed at a ratio of 100:50 pph by weight.

For the second thermoset, the epoxide polymerizer was EPON® 828, and the curing agent was the tetraethylenepentamine curing agent Ancamine® TEPA (AIR PRODUCTS). The two components were mixed at a ratio of 100:16 pph by weight.

The samples were subjected to fracture testing by the TDCB protocol, as described for Example 1. The peak fracture load, $P_{c,virgin}$, was measured. After sample failure, 30 microliters of chlorobenzene was injected onto the crack plane, the two crack faces were realigned, and the sample was allowed to heal for 24 h at room temperature (22° C.). After the 24 hours, the healed TDCB samples were again stressed to failure, the load-displacement curve was recorded, and the peak fracture load, $P_{c,healed}$, was measured. The average healed peak loads for the first and second thermosets were 80 Newtons (N) and 60 N, respectively. These were comparable to the average healed peak load of 66 N measured for the DGEBA/DETA epoxy thermoset of Example 1.

Yet another set of epoxy thermoset samples were prepared as described in Example 1, but using different ratios of the DGEBA/DETA components. The ratios used for preparing the thermosets were 100:8, 100:12 (identical to Example 1), 100:16, 100:20 and 100:25. The components were poured into silicone rubber molds after mixing, and cured for 24 h at room temperature, followed by 24 h at 35° C. The cured thermoset samples were shaped for use as short-groove TDCB test samples, in which a 25 mm groove was molded. These samples were subjected to fracture testing by the TDCB protocol, as described for Example 1. The peak fracture load, $P_{c,virgin}$, was measured. After the crack had propagated through the 25 mm groove, 5 microliters of chlorobenzene was injected onto the crack plane, and the sample was allowed to heal for 24 h at room temperature (22° C.). After the 24 hours, the healed TDCB samples were again stressed to failure, the load-displacement curve was recorded, and the peak fracture load, $P_{c,healed}$, was measured.

Figure 2:
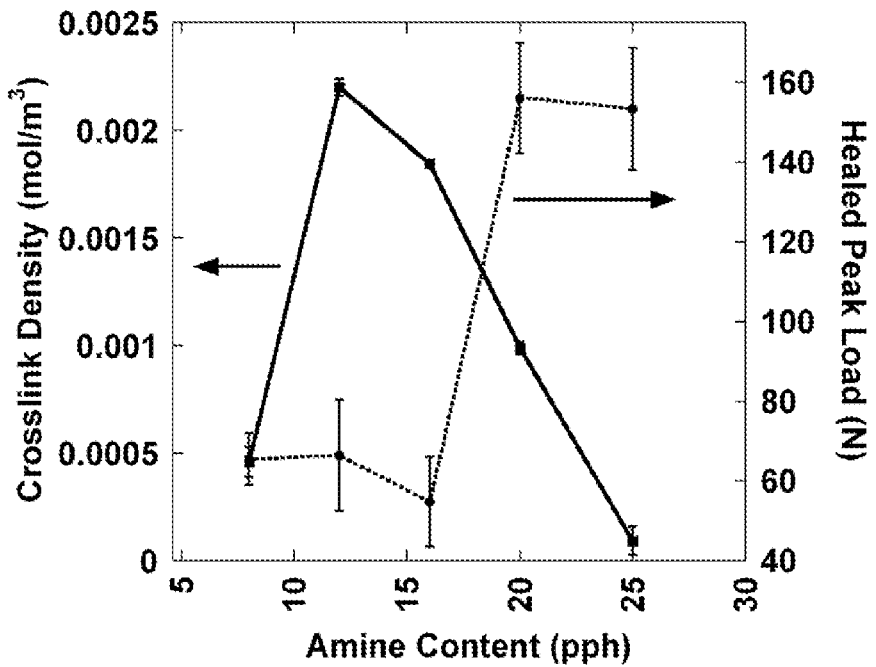
FIG. 2 is a graph of crosslink density of epoxy thermoset samples as a function of amine content, together with a graph of peak load as a function of amine content, for samples healed by treatment with chlorobenzene.

FIG. 2 is a graph of crosslink density as a function of amine content, together with a graph of healed peak load as a function of amine content. The healed peak load increased with increasing amine concentration in the mixture used to form the thermoset. The stoichiometric composition, formed using 12 pph DETA, had the highest crosslink density. For amine concentrations above this stoichiometric point, healing performance was inversely related to crosslink density.

Example 3

Formation of Capsules Including a Solvent

Capsules containing a solvent were prepared by in situ polymerization of urea and formaldehyde, according to the procedure of Brown et al. (*J. Microencapsulation* 20(6), 719-730, 2003). The urea-formaldehyde (UF) microcapsules were formed by mixing 200 mL of water and 5.0 g urea in a 600 mL beaker, followed by the addition of 0.5 g resorcinol and 0.5 g ammonium chloride. A 2.5 wt % solution of ethylene maleic anhydride copolymer (50 ml) was added to this mixture. The pH of the mixture was adjusted to 3.5 using 50 wt % NaOH and 1N HCl aqueous solutions, and the mixture was then agitated at 550 rpm.

Chlorobenzene (60 ml) was added to the stirred solution, followed by 12.67 g of a 37% aqueous formaldehyde solution. The temperature of the reaction mixture was raised to 55° C. After 4 hours, the reaction mixture was cooled to room temperature, and the microcapsules were separated. The microcapsule slurry was diluted with an additional 200 mL of water and washed with water (3×100 ml). The capsules were isolated by vacuum filtration, air dried and sieved to remove aggregated capsules. The UF capsules were spherical with smooth surfaces, and had an average diameter of 160±20 micrometers. No leakage of chlorobenzene through the shell walls was observed, as indicated by a constant mass loss shown in thermogravimetric analysis (TGA) experiments after several weeks.

Capsules containing phenylacetate, hexanes or xylenes were prepared by the same method. In addition, hollow UF capsules containing no solvent were formed. In a modification of the above procedure, the amounts of all the capsule wall components (urea, resorcinol, ammonium chloride and ethylene maleic anhydride copolymer) were reduced by one half. The amount of solvent was maintained at 60 mL, such that the capsule walls had a thickness that was reduced by one half. Capsules having these thinner capsule walls were not used in the examples below, but could be used as replacements for the regular capsules.

Attempts to encapsulate the solvents nitrobenzene, NMP, DMA, DMF and DMSO using the above method were initially unsuccessful. Attempt to encapsulate these solvents using reverse-phase encapsulation procedures also were initially unsuccessful. One possible explanation for the difficulty in encapsulating these solvents is that their high polarity relative to chlorobenzene inhibits the formation and/or stabilization of the capsule wall.

Capsules containing a solvent also were prepared by interfacial polymerization, according to the procedure of Cho et al. (*Adv. Mater.* 2006, 18, 997). A urethane prepolymer was synthesized by first dissolving toluene 2,4-diisocyanate (TDI; SIGMA-ALDRICH, St. Louis, Mo.; 22.0 g) in cyclohexanone (142 g). The diol reactant, 1,4-butanediol (5.0 g), was added to this stirred mixture at 5 mL/min using a syringe pump, and the reaction mixture was stirred and heated at 80° C. for 24 hours. To avoid formation of a gel during microencapsulation, the mol ratio of TDI to 1,4-butanediol was kept less than 2.3. Once the prepolymer was formed, the cyclohexanone was evaporated under vacuum at 100° C. The urethane prepolymer had excess isocyanate functional groups, which could be reacted to form a higher molecular weight polymer through the use of a chain extender. The amount of chain extender to add was determined by titration of the isocyanate functional group in urethane prepolymer, following ASTM D2572-97. Polyurethane microcapsules containing chlorobenzene were then formed by mixing the urethane prepolymer (3.0 g) and dibutyltin dilaurate (DBTL-Sn; GELEST, 1 g) in 32 g chlorobenzene, and then adding this mixture to 28.8 g of a water solution containing 15 wt % gum arabic (SIGMA-ALDRICH, suspending agent). After stirring for 30 min at 70° C., an ethylene glycol chain extender was added to the mixture at 5 mL/min. The amount of ethylene glycol was 30 wt % relative to the urethane prepolymer. In contrast to the UF capsules, the polyurethane capsules did not form spheres, but rather were shriveled in appearance. In subsequent tests, it appeared that the polyurethane capsules de-bonded from the solid polymer matrix when intersected by a crack, and did not release as much solvent as did the UF capsules.

Example 4

Epoxy Thermoset Composites Containing Capsules Including a Solvent

Epoxy thermoset composites were formed by incorporating the chlorobenzene/UF capsules of Example 3 with the epoxy polymerizers of Example 1. The ratio of EPON® 828 to diethylenetriamine curing agent was 100:12 pph by weight, and the loading of capsules ranged from 10 to 20 wt %. Each mixture was poured into a silicone rubber mold, and allowed to cure for 24 h at room temperature, followed by 24 h at 35° C. The cured thermoset composite samples were shaped for use as short-groove TDCB test samples, in which a 25 mm groove was molded.

Epoxy thermoset composites also were formed by incorporating the chlorobenzene/polyurethane capsules of Example 3 with the epoxy polymerizers of Example 1. Short-groove TDCB samples were formed by the above procedure for the composites containing the UF capsules.

In addition, epoxy thermoset composites also were formed by incorporating other UF capsules of Example 3 with the epoxy polymerizers of Example 1. The capsules used contained either hexanes or xylenes, or were hollow capsules. Short-groove TDCB samples were formed by the above procedure for the composites containing the chlorobenzene/UF capsules.

Example 5

Self-Healing Testing of Composites Containing Capsules Including a Solvent

The composites of Example 4 were subjected to fracture testing by the TDCB protocol described in Example 1. Short-groove TDCB specimens were used for self-healing, since the average crack face separation was only 3 micrometers near the pin holes of the sample, rather than 26 micrometers in the long-groove TDCB specimens. This smaller crack face separation provided for a more intimate contact between the crack faces.

Fractured samples were unloaded, allowing the crack faces to come back into contact, and healed in this state for 24 hours at room temperature. The healed TDCB samples were again stressed to failure, and the load-displacement curve was recorded. All healed samples were tested after 24 hours, unless otherwise stated. Healing efficiency was calculated based on the peak load at fracture. The healing efficiency based on peak load at fracture, $\eta$, was defined as the ratio of the peak loads at fracture for the healed sample and for a virgin sample, $\eta = P_{c,healed}/P_{c,virgin}$. The average healing efficiency and standard deviations were calculated from at least five fracture tests. Crack surfaces were imaged by ESEM with a Philips XL30 ESEM-FEG instrument, after a sputter-coating treatment of the crack surface with a gold-palladium source.

Figure 3:
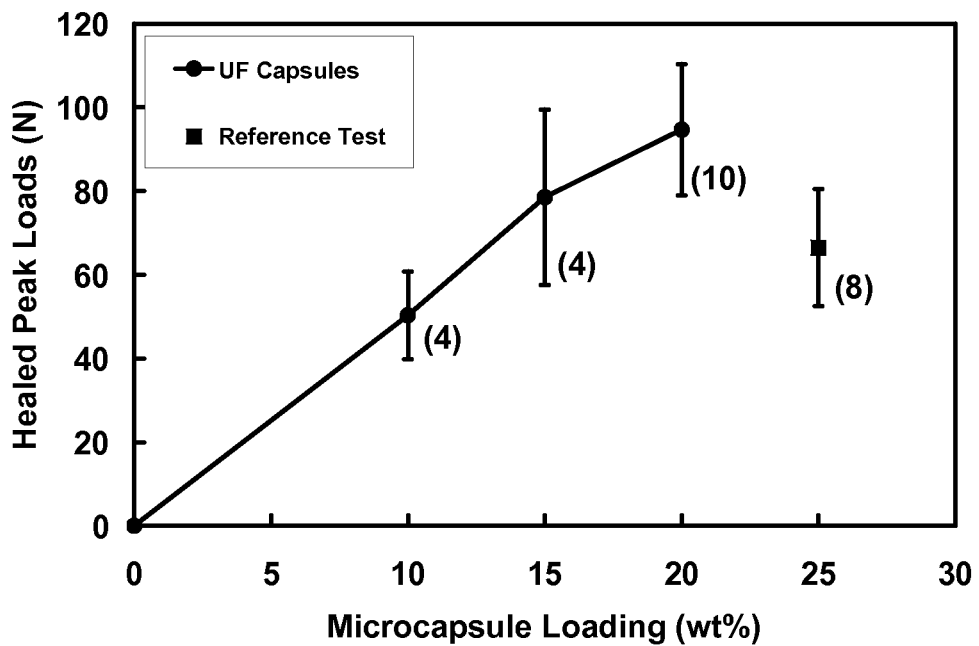
FIG. 3 is a graph of peak load for healed composites as a function of capsule loading in the composite, where the capsules included chlorobenzene.

FIG. 3 is a graph of peak load for healed composites as a function of chlorobenzene/UF capsule loading in the composite. The "Reference Test" data point refers to an epoxy thermoset of Example 1, in which the solvent injected onto the crack plane was chlorobenzene. The healing efficiency of the composites increased with the amount of microcapsules in the system.

Figure 4:
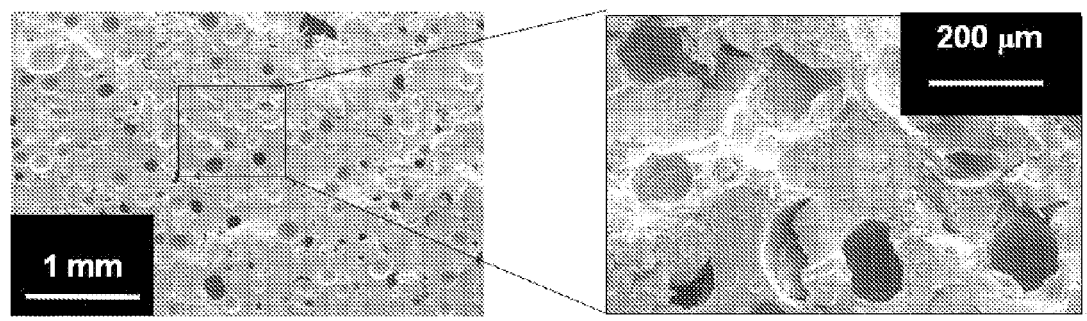
FIG. 4 is a set of scanning electron microscopy (SEM) images of the fracture surface of a self-healed composite that contained 20 wt % capsules that included chlorobenzene.

FIG. 4 is an SEM image of the fracture surface of a self-healed sample that contained 20 wt % chlorobenzene/UF capsules. The crack plane for the epoxy matrix without capsules was smooth, but the crack plane for this composite indicated that the capsules had fractured. The chlorobenzene/UF capsules ruptured when intersected by a crack in the epoxy matrix. The solvent in the capsules was released, and the solvent wetted the crack plane surface.

Figure 5:
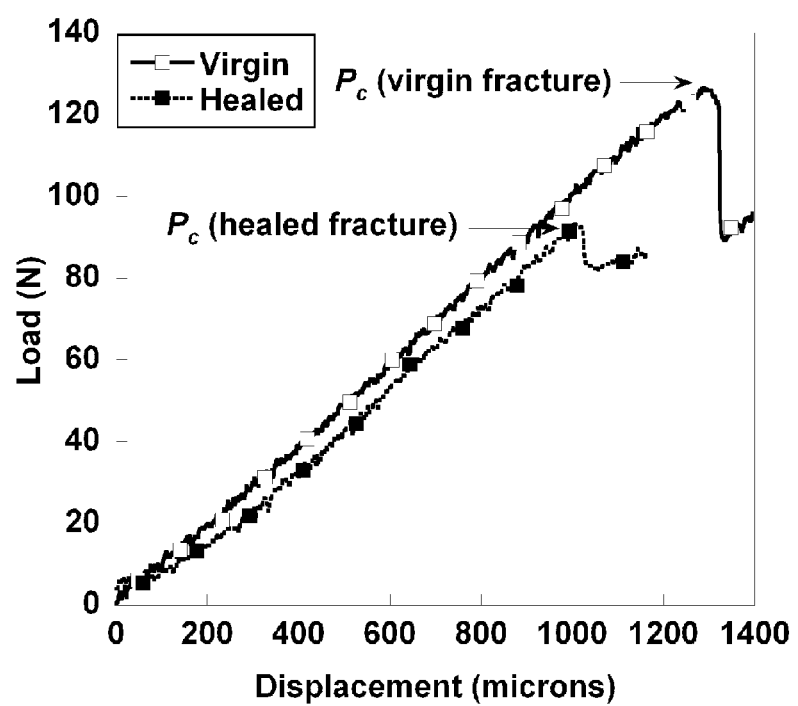
FIG. 5 is a set of load-displacement curves for a composite containing 20 wt % capsules that included chlorobenzene, and for the same composite after self-healing.

FIG. 5 is a set of load-displacement curves for an epoxy composite containing 20 wt % chlorobenzene/UF capsules, and for the same composite after self-healing. This composite had a 74% healing efficiency, which was comparable to the 70% healing efficiency for the epoxy thermoset that was healed by manual injection of chlorobenzene (Example 1). In addition, the presence of the capsules increased the overall toughness of the composite, with a peak load of over 120 N.

Figure 6:
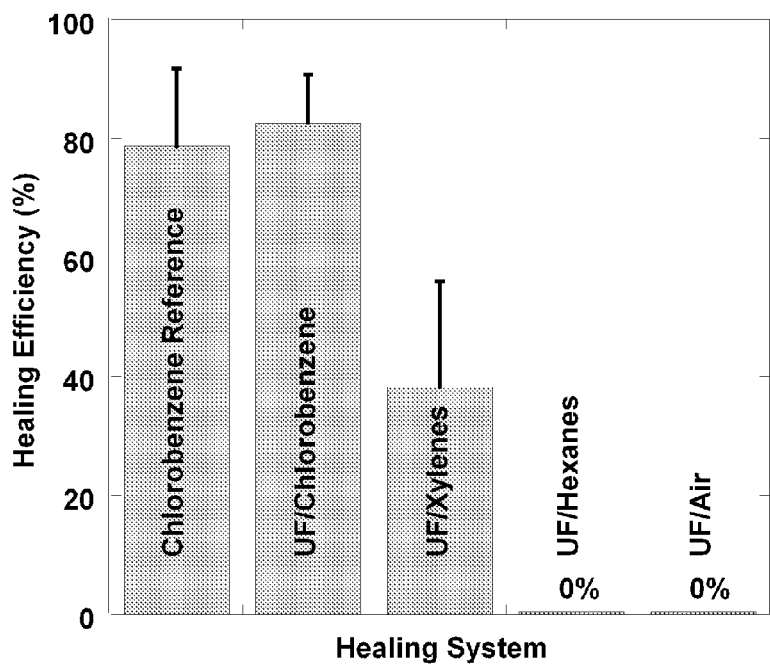
FIG. 6 is a graph of healing efficiencies for composites containing 20 wt % capsules having different interior volume compositions.

FIG. 6 is a graph of healing efficiencies for epoxy composites containing 20 wt % of UF capsules having different interior volume compositions. This graph also shows the healing efficiency measured for the epoxy thermoset of Example 1 that had been treated manually with chlorobenzene, labeled "Chlorobenzene Reference." The composite containing 20 wt % chlorobenzene/UF capsules, labeled "UF/Chlorobenzene", had a healing efficiency of 82%. This was comparable to the 70% healing efficiency measured for the manual treatment with chlorobenzene. In contrast, the composite containing 20 wt % xylenes/UF capsules, labeled "UF/Xylenes", had a healing efficiency of only 38%. The composites containing either 20 wt % hexanes/UF capsules (labeled "UF/Hexanes") or 20 wt % hollow UF capsules (labeled "UF/Air") each had 0% healing efficiencies. The presence of hollow microcapsules did not toughen the composite, as evidenced by a peak load for the virgin material of only 70 N.

Example 6

Formation of Capsules Including a Solvent and a Polymerizer

Capsules containing a solvent and a polymerizer were prepared as described in Example 3, except that the amounts of all the capsule wall components (urea, resorcinol, ammonium chloride and ethylene maleic anhydride copolymer) were reduced by one half, and the 60 mL of chlorobenzene was replaced with 60 mL of a solution of epoxide polymerizer EPON® 828 in chlorobenzene. Two sets of capsules were formed, each having a different concentration of the epoxide polymerizer. One set of capsules included 5.0 wt % epoxide polymerizer, and the other set of capsules included 13.7 wt % epoxide polymerizer. The capsules had an average diameter of 180 micrometers.

Example 7

Epoxy Thermoset Composites Containing Capsules Including a Solvent and a Polymerizer Epoxy thermoset composites were formed by incorporating the chlorobenzene+epoxy capsules of Example 6 with the epoxy polymerizers of Example 1. The ratio of EPON® 828 to diethylenetriamine curing agent was 100:12 pph by weight, and the loading of capsules ranged from 5 to 20 wt %. Each mixture was poured into a silicone rubber mold, and allowed to cure for 24 h at room temperature, followed by 24 h at 35° C. The cured thermoset composite samples were shaped for use as short-groove TDCB test samples.

Example 8

Self-Healing Testing of Composites Containing Capsules Including a Solvent and a Polymerizer The composites of Example 7 were subjected to fracture testing by the TDCB protocol described in Example 1. Fractured samples were unloaded, allowing the crack faces to come back into contact, and healed in this state for 24 hours at room temperature. In addition to the composites, a pure epoxy thermoset sample was healed by injection of 5 microliters of a 5 wt % solution of the epoxide polymerizer in chlorobenzene, as described in Example 1. The healed TDCB samples were again stressed to failure, and the load-displacement curve was recorded. All healed samples were tested after 24 hours, unless otherwise stated. Healing efficiency was calculated based on the peak load at fracture. The healing efficiency based on peak load at fracture, $\eta$, was defined as the ratio of the peak loads at fracture for the healed sample and for a virgin sample, $\eta = P_{c,healed}/P_{c,virgin}$. The average healing efficiency and standard deviations were calculated from at least five fracture tests. Crack surfaces were imaged by SEM with a Philips XL30 ESEM-FEG instrument, after a sputter-coating treatment of the crack surface with a gold-palladium source. Certain samples also were tested again after 7 days to evaluate their ability to heal a crack that deviated from the original crack path.

Figure 7:
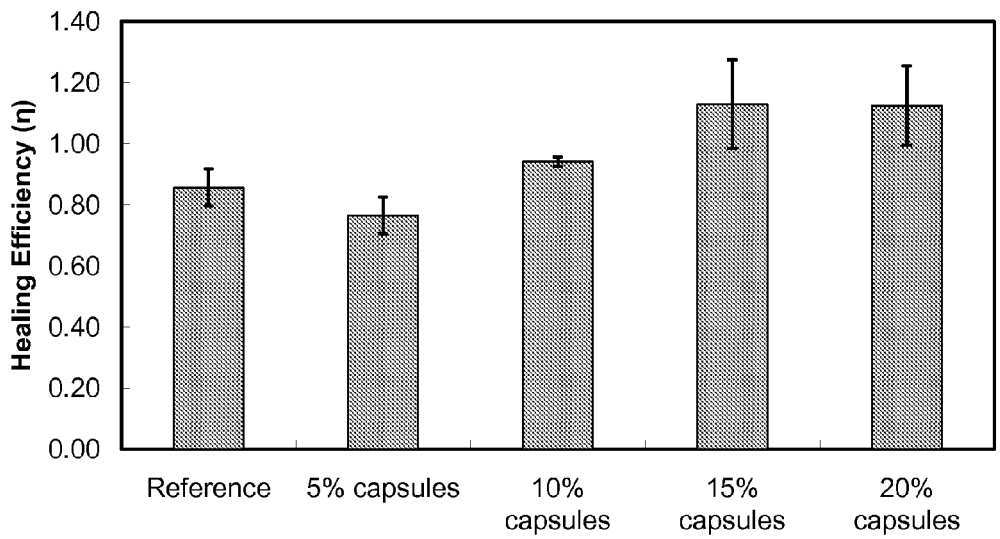
FIG. 7 is a graph of healing efficiencies for a pure epoxy thermoset, and for epoxy composites containing from 5 to 20 wt % capsules, where the capsules included 5 wt % of an epoxide polymerizer in chlorobenzene.

FIG. 7 is a graph of healing efficiencies for the epoxy composites having from 5 to 20 wt % capsules, where the capsules included a 5 wt % solution of the epoxide polymerizer in chlorobenzene. The "Reference" sample was the pure epoxy thermoset that was healed by manual injection of the epoxide/chlorobenzene solution. The healing efficiency of the composites containing chlorobenzene solvent and epoxide polymerizer in capsules increased as the loading of the capsules was increased from 5 wt % to 15 wt %. Composites containing 15 and 20 wt % of the capsules each had healing efficiencies of 100%. The healing efficiency of the composite containing 10 wt % capsules was higher than that of the manually healed sample.

Figure 8:
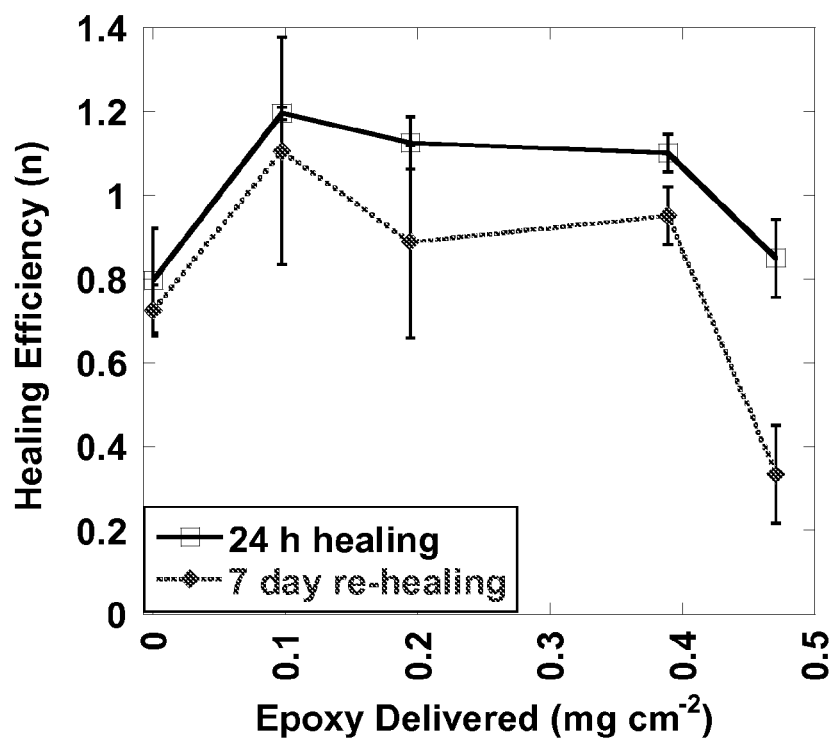
FIG. 8 is a graph of healing efficiencies for epoxy composites containing capsules delivering different ratios of chlorobenzene and epoxide polymerizer to the crack.

FIG. 8 is a graph of healing efficiencies for epoxy composites containing capsules having different ratios of chlorobenzene solvent and epoxide polymerizer. The capsules in each composite were loaded to provide 3.15 milligrams per square centimeter ($mg/cm^2$) chlorobenzene to the crack plane. Thus, the composites that contained epoxide polymerizer in chlorobenzene at concentrations of 0.0, 3.0, 5.8, 11.0, and 13.0, correspond to the "Epoxy Delivered" values of 0.0, 0.1, 0.2, 0.4 and 0.5 $mg/cm^2$, respectively. The capsules containing solvent and 13.0 wt % epoxy had an average diameter of 258 micrometers. The capsules containing solvent only had an averaged diameter of 127 micrometers. The ratio of capsules containing solvent only to capsules containing solvent and 13.0 wt % epoxy was adjusted to obtain a constant solvent delivery with an increasing epoxy delivery. The samples were able to re-heal when subjected to a crack that deviated from the original crack path. In the case of the composites, the new crack ruptured other microcapsules, releasing more epoxide polymerizer and solvent into the new crack plane.

Figure 9:
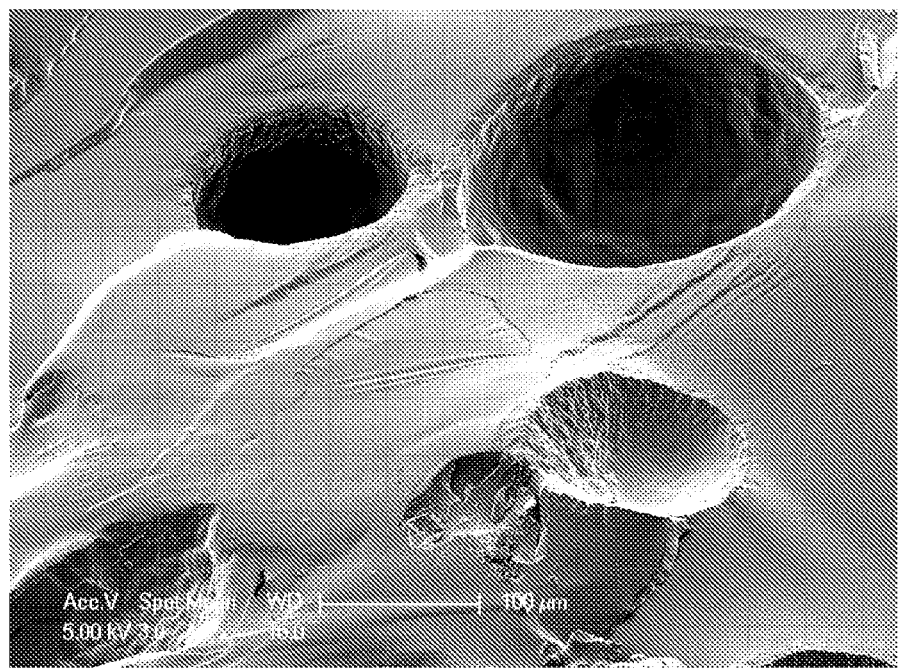
FIGS. 9 and 10 are SEM images of crack planes of a composite containing 20 wt % capsules that included 5 wt % epoxide polymerizer in chlorobenzene.
Figure 10:
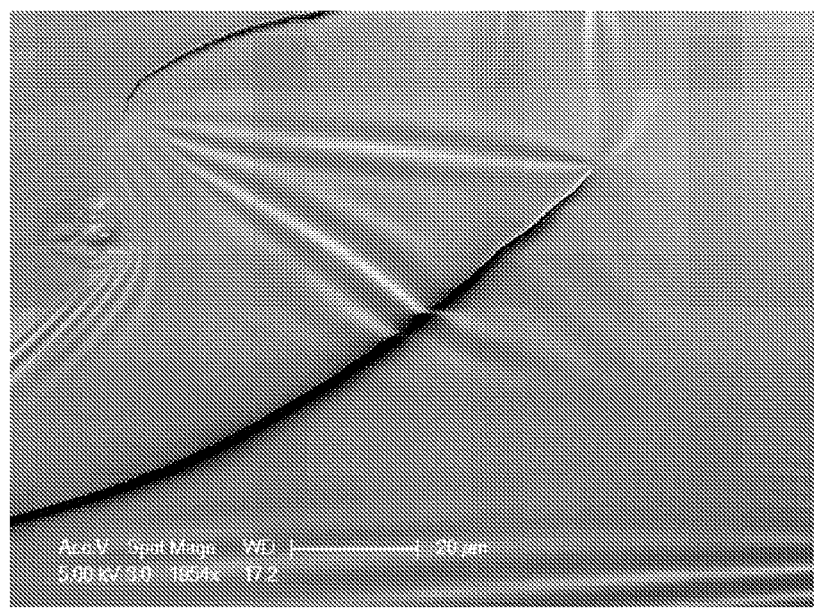
Figure 11:
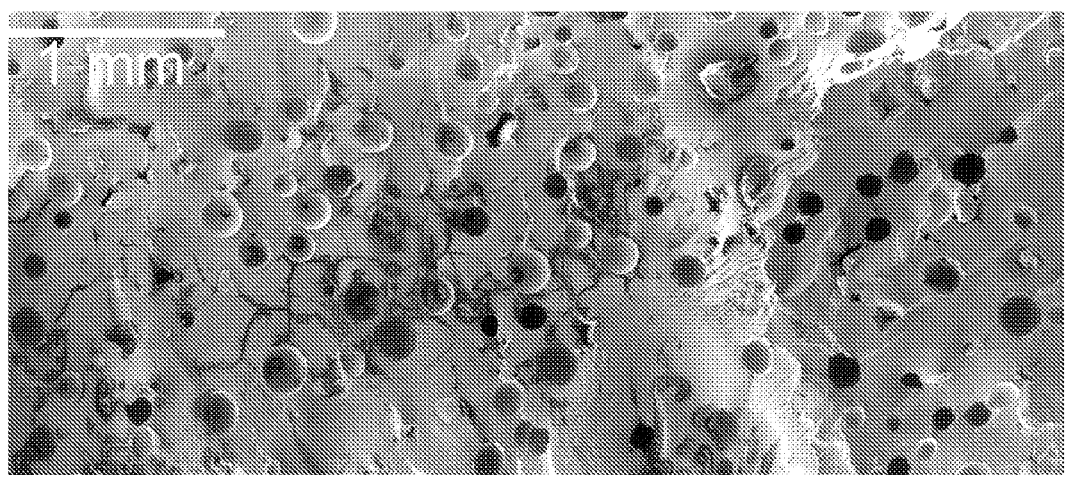
FIG. 11 is an SEM image of the crack plane of a composite containing 15 wt % capsules that included 5 wt % epoxide polymerizer in chlorobenzene.
Figure 12:
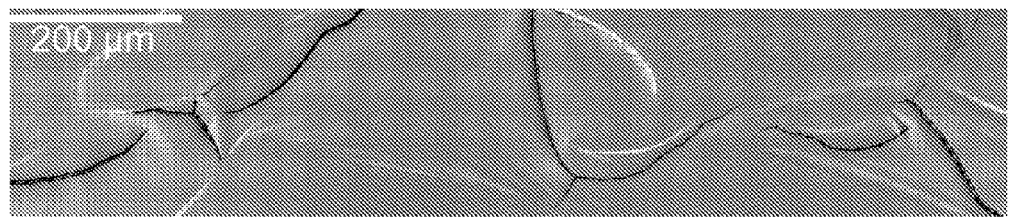
FIG. 12 is an SEM image of the crack plane of a composite containing 10 wt % capsules that included 5 wt % epoxide polymerizer in chlorobenzene.
Figure 13:
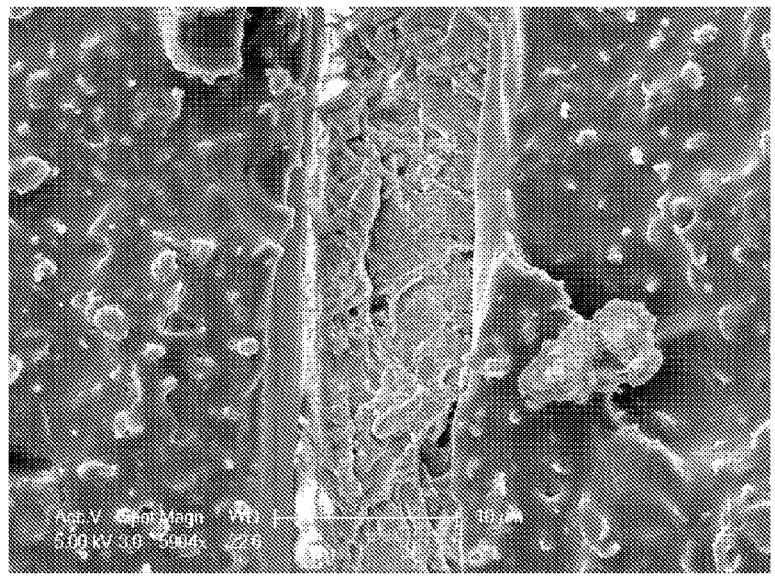
FIG. 13 is a cross-sectional image of a composite in which a mixture of solvent and 5 wt % epoxide polymerizer was delivered to the crack plane.

FIGS. 9-13 are SEM images of epoxy composites after self-healing. FIG. 9 is an image of the crack plane of a composite containing 20 wt % of capsules that included 5 wt % epoxide polymerizer in chlorobenzene. The holes in the surface indicated the presence of ruptured capsules. FIG. 10 is an image of the same sample, in which the larger magnification showed the thin film formed on the crack plane. FIG. 11 is an image of the crack plane of a composite containing 15 wt % of capsules that included 5 wt % epoxide polymerizer in chlorobenzene. FIG. 12 is an image of the crack plane of a composite containing 10 wt % of capsules that included 5 wt % epoxide polymerizer in chlorobenzene, in which the larger magnification showed the thin film formed on the crack plane. FIG. 13 is a cross-sectional image of a composite in which 5% epoxide polymerizer was delivered to the crack plane. The new material formed in the crack was present in the center of the image.

Figure 14:
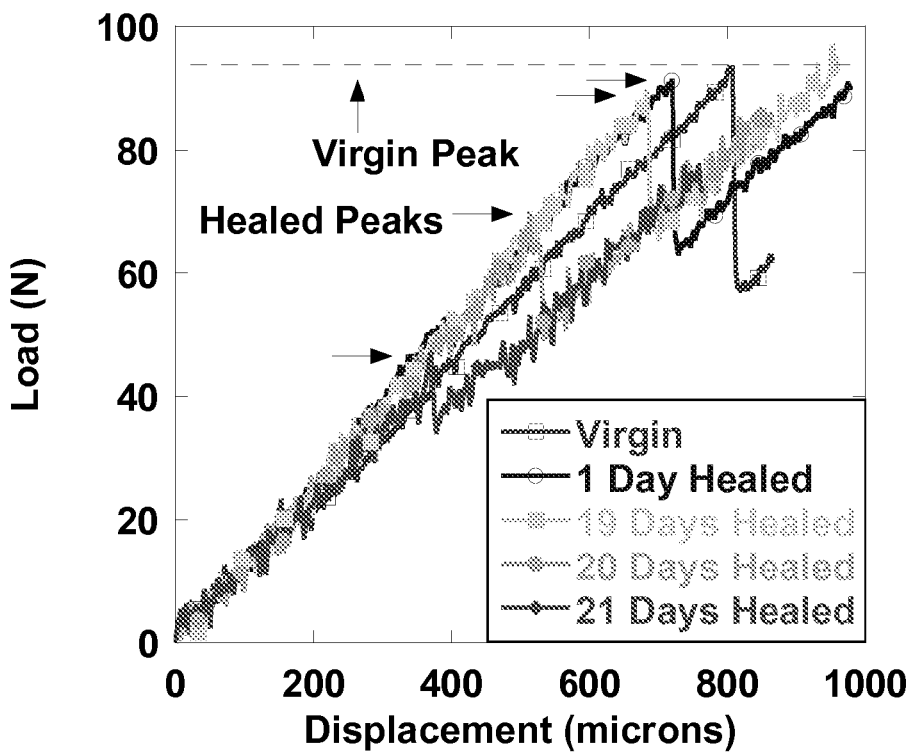
FIG. 14 is a set of load-displacement curves for a composite containing 15 wt % capsules that included 5 wt % epoxide polymerizer in chlorobenzene.

FIG. 14 is a set of load-displacement curves for an epoxy composite containing 15 wt % capsules having a liquid containing 5 wt % epoxide polymerizer in chlorobenzene. The "1 Day Healed" curve corresponded to the normal fracture test after 24 hours of healing. The "19 Days Healed" curve corresponded to a third fracture test, performed 19 days after the initial fracture. After 19 days at room temperature, this sample had re-healed, as indicated by a recovery of the original fracture toughness, up to the level achieved when healing was tested after 24 hours. Subsequent testing of this sample over the next three days showed a decrease in the healed peak load.

One possible explanation for this repeated healing of the same specimen is that the new crack deviates from the original crack path, due to the presence of healed material in the original crack. This deviation can rupture new microcapsules, releasing additional solvent and epoxide polymerizer to the system. One possible explanation for the decrease in healing over a number of healing cycles is that the number of amine groups in the epoxy matrix decrease each time healing occurs. Thus, the polymerizer released cannot react with as many native activating amine groups, and less new polymer is formed.

Example 9

Solvent-Promoted Healing of an Epoxy Thermoset by Aromatic Ester Solvents and Optionally a Polymerizer Following the procedure of Example 1, the aromatic ester solvents phenylacetate (PA; SIGMA-ALDRICH) and ethyl phenylacetate (EPA; SIGMA-ALDRICH) were screened for their healing ability by manually injecting solvent, or a mixture of the solvent with 13 wt % of EPON® 828 epoxide polymerizer, on the crack plane of a fractured test specimen. In addition, a mixture of chlorobenzene with 13 wt % of EPON® 828 epoxide polymerizer was also screened. After sample failure, 30 microliters of one of the solvents was injected onto the crack plane, the two crack faces were realigned, and the sample was allowed to heal for 24 h at room temperature (22° C.). For screening of the pure solvents, long groove epoxy samples were used, and 30 microliters of solvent was injected into the crack. For screening of the solvent-polymerizer mixtures, short groove epoxy samples were used, and 5 microliters of the mixture was injected into the crack. After the 24 hours, the healed TDCB samples were again stressed to failure, the load-displacement curve was recorded, and the peak fracture load, $P_{c,healed}$, was measured.

The $P_{c,healed}$ values for the healed samples are listed in Table 1, below. The average $P_{c,healed}$ and standard deviations were calculated from at least five tests. The values for PA, EPA and their mixtures with epoxide polymerizer were comparable to those of the samples healed with chlorobenzene or its mixture with epoxide polymerizer. One possible explanation for these results is that PA and EPA have polarities similar to that of chlorobenzene. In this example, solvent polarity is measured by the dielectric constant ($\in_r$), and the $\in_r$ values for chlorobenzene, PA and EPA are 5.6, 6.9 and 5.4, respectively. An advantage to using PA and/or EPA in self-healing materials is their lower toxicity relative to chlorobenzene.

TABLE 1

Healing Performance Of Thermosets And Thermoset Composites

| | Healed Peak Fracture Load (N) | | | |
|---|---|---|---|---|
| Solvent | Solvent Injection | Solvent + Polymerizer Injection | Solvent in Capsules | Solvent + Polymerizer in Capsules |
| Chlorobenzene | 66.4 [13.9] | 55.7 [6.2] | 78.5 [12.3] | 99.3 [14.9] |
| Phenylacetate | 66.9 [11.7] | 69.5 [11.0] | 103.1 [10.8] | 83.8 [6.6] |
| Ethyl Phenylacetate | 70.2 [10.4] | 70.3 [5.0] | 48.2 [5.8] | 83.8 [9.2] |

Example 10

Epoxy Thermoset Composites Containing Capsules Including an Aromatic Ester Solvent and Optionally a Polymerizer Capsules containing a solvent and a polymerizer were prepared as described in Example 6, except that the 60 mL of EPON® 828 in chlorobenzene was replaced with a solution of EPON® 828 epoxide polymerizer in an ester solvent, at various weight percentages of the epoxide polymerizer. The ester solvent was selected from PA and EPA. The capsules were sieved, and the average diameter of the capsules was from 125 to 355 micrometers.

Epoxy thermoset composites were formed by incorporating one of these types of capsules with the epoxy polymerizers of Example 1. The ratio of EPON® 828 to diethylenetriamine curing agent was 100:12 pph by weight, and the loading of capsules was 15 wt %. The mixture was poured into a silicone rubber mold, and allowed to cure for 24 h at room temperature, followed by 24 h at 35° C. The cured thermoset composite samples were shaped for use as short-groove TDCB test samples. The composites were subjected to fracture testing by the TDCB protocol described in Example 8. Fractured samples were unloaded, allowing the crack faces to come back into contact, and healed in this state for 24 hours at room temperature. The healed samples were again stressed to failure, and the $P_{c,healed}$ values for the healed samples are listed in Table 1, above, where the average $P_{c,healed}$ and standard deviations were calculated from at least five tests.

Figure 15:
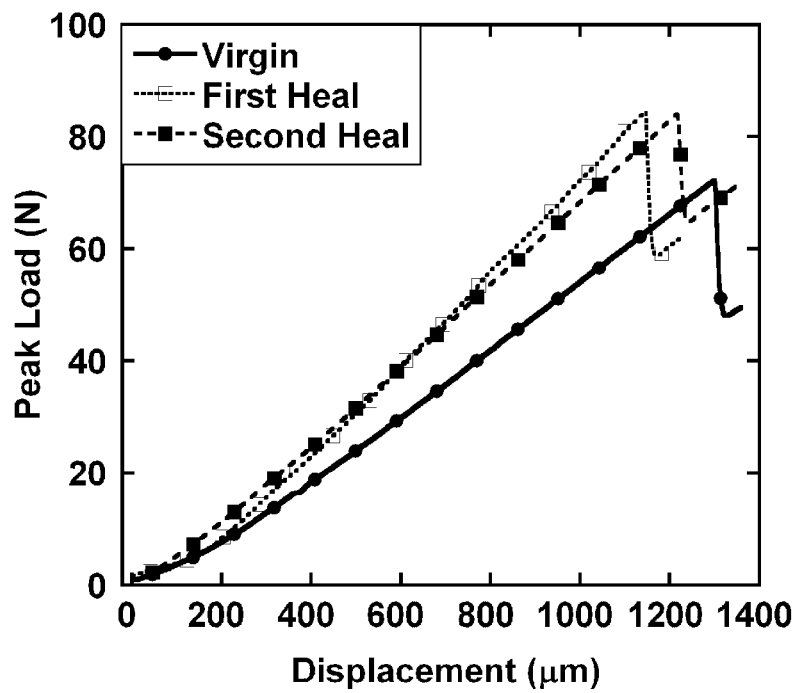
FIG. 15 is a set of load-displacement curves for a composite containing 15 wt % capsules that included 13 wt % epoxide polymerizer in ethyl phenylacetate.

One of these types of composites was further tested by measuring the load-displacement curve. The composites included 15 wt % capsules containing a mixture of EPA and 13 wt % EPON® 828 epoxide polymerizer. FIG. 15 depicts the load-displacement curves. The "First Heal" curve corresponded to the normal fracture test after 24 hours of healing. The "Second Heal" curve corresponded to a third fracture test, performed 7 days after the initial fracture.

Figure 16:
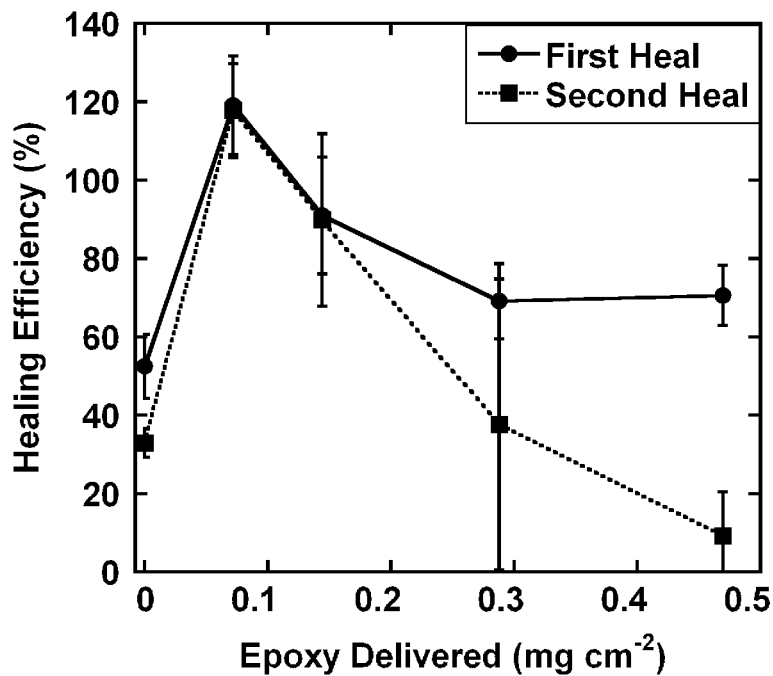
FIG. 16 is a graph of healing efficiencies for epoxy composites containing capsules delivering different ratios of ethyl phenylacetate and epoxide polymerizer to the crack.

A similar set of epoxy thermoset composites was formed using capsules containing a mixture of EPA and EPON® 828 epoxide polymerizer. The relative amounts of EPA and polymerizer in the composite were varied so that the capsules provided 3.15 mg/cm² EPA to the crack plane, and provided from 0 to approximately 0.5 mg/cm² epoxide polymerizer to the crack plane. The thermoset composite samples were shaped for use as short-groove TDCB test samples, and were subjected to fracture testing by the TDCB protocol described in Example 8. Fractured samples were unloaded, allowing the crack faces to come back into contact, and healed in this state for 24 hours at room temperature. The healed samples were again stressed to failure, and the healing efficiency was calculated. FIG. 16 is a graph of these healing efficiencies.

Example 11

Figure 17:
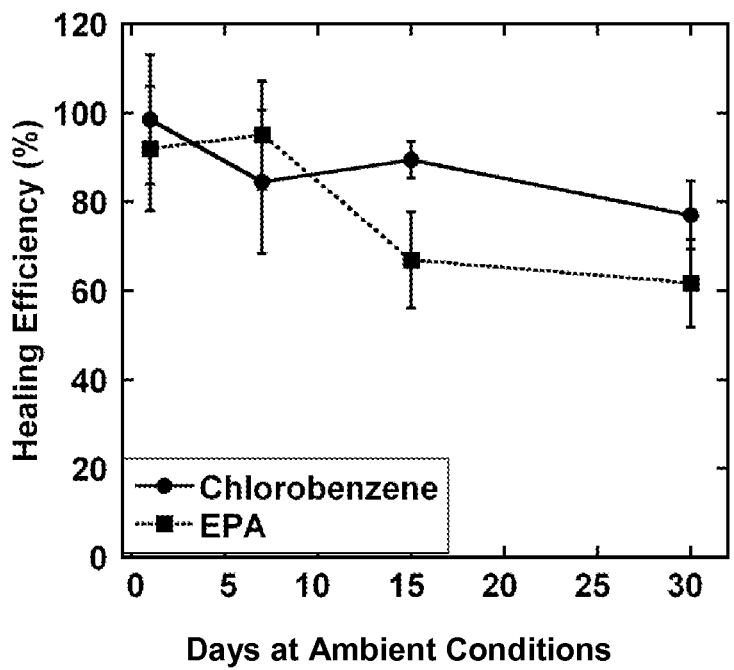
FIG. 17 is a graph of healing efficiencies for epoxy composites containing 15 wt % capsules that included 13 wt % epoxide polymerizer in chlorobenzene or in ethyl phenylacetate.

Aging Studies of Epoxy Thermoset Composites Containing Capsules Including a Solvent and a Polymerizer Capsules containing a solvent and a polymerizer were prepared using the above procedures. The capsules contained a mixture of either chlorobenzene or EPA with 13 wt % EPON® 828. Short-groove TDCB epoxy thermoset composite samples including 15 wt % one of these types of capsules were formed using the above procedures. The samples were exposed to ambient conditions of 22° C. and 40% relative humidity for either 7 days, 15 days or 30 days. Following this time, the samples were subjected to fracture testing by the TDCB protocol described in Example 8. Fractured samples were unloaded, allowing the crack faces to come back into contact, and healed in this state for 24 hours at room temperature. The healed samples were again stressed to failure, and the healing efficiency was calculated. FIG. 17 depicts a graph of the healing efficiencies as a function of time at ambient conditions. For both the chlorobenzene-containing capsules and the EPA-containing capsules, the ability to heal remains at a desirable level for at least one month.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:
1. A composite material, comprising:
a solid polymer matrix,
a plurality of capsules inside the solid polymer matrix, and
a solvent and at least 5.0 wt % of a polymerizer, in the capsules;
where there is no polymerizer outside of the capsules, and the solvent has a swelling ratio with the solid polymer matrix of at least 1.1.

2. A method of making the composite material of claim 1, comprising:
   combining ingredients comprising the plurality of capsules and a matrix precursor, and
   solidifying the matrix precursor to form the solid polymer matrix.

3. The composite material of claim 1, where the solvent has a swelling ratio with the polymer of at least 1.2.

4. The composite material of claim 1, where the solvent has a swelling ratio with the polymer of at least 1.5.

5. The composite material of claim 1, where the solvent has a swelling ratio with the polymer of at least 1.9.

6. The composite material of claim 1, where the solvent comprises a polar aprotic solvent.

7. The composite material of claim 1, where the solvent comprises at least one solvent selected from the group consisting of chlorobenzene, phenylacetate, ethyl phenylacetate, THF, dichloromethane, nitrobenzene, NMP, DMA, DMF, DMSO, and acetonitrile.

8. The composite material of claim 1, where the solvent comprises chlorobenzene, phenylacetate, ethyl phenylacetate, or mixtures thereof.

9. The composite material of claim 1, where the solid polymer matrix comprises a thermoset.

10. The composite material of claim 1, where the solid polymer matrix comprises an epoxy thermoset.

11. The composite material of claim 1, where the capsules have an average diameter of from 10 nm to 1 mm.

12. The composite material of claim 1, where the composite material does not comprise an exogenous activator.

13. The composite material of claim 1, where the composite material is self-healing by the self-healing test.

14. The composite material of claim 1, where the composite material has an average healing efficiency of at least 60% as measured by the self-healing test.

15. The composite material of claim 1, where the composite material has an average healing efficiency of at least 70% as measured by the self-healing test.

* * * * *